(12) United States Patent
Cevahir

(10) Patent No.: US 10,678,765 B2
(45) Date of Patent: Jun. 9, 2020

(54) SIMILARITY CALCULATION SYSTEM, METHOD OF CALCULATING SIMILARITY, AND PROGRAM

(71) Applicant: Rakuten, Inc., Tokyo (JP)

(72) Inventor: Ali Cevahir, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 353 days.

(21) Appl. No.: 14/888,939

(22) PCT Filed: Mar. 31, 2014

(86) PCT No.: PCT/JP2014/059470
§ 371 (c)(1),
(2) Date: Nov. 4, 2015

(87) PCT Pub. No.: WO2015/151162
PCT Pub. Date: Oct. 8, 2015

(65) Prior Publication Data
US 2016/0085783 A1  Mar. 24, 2016

(51) Int. Cl.
*G06F 16/22* (2019.01)
*G06F 16/245* (2019.01)
(Continued)

(52) U.S. Cl.
CPC ...... *G06F 16/2237* (2019.01); *G06F 16/2264* (2019.01); *G06F 16/245* (2019.01); *G06F 16/285* (2019.01); *G06F 16/35* (2019.01)

(58) Field of Classification Search
CPC ........... G06F 17/30244; G06F 17/3025; G06F 16/355; G06F 16/5838; G06F 21/14; G06F 16/2237
See application file for complete search history.

(56) References Cited

U.S. PATENT DOCUMENTS 8,676,632 B1 * 3/2014 Watson ............ G06Q 30/0206
705/1.1
9,065,727 B1 * 6/2015 Liu ........................ H04L 43/04
(Continued)

FOREIGN PATENT DOCUMENTS

JP       2013-065146 A      4/2013

OTHER PUBLICATIONS

Takahiro Sasaki, Hideaki Goto, "High-Accuracy Clustering Using LDA for Fast Japanese Character Recognition", IEICE Technical Report, Dec. 6, 2012 (Dec. 6, 2012), vol. 112, No. 357, pp. 19 to 24.
(Continued)

*Primary Examiner* — Mariela Reyes
*Assistant Examiner* — Courtney Harmon
(74) *Attorney, Agent, or Firm* — HEA Law PLLC

(57) ABSTRACT

To calculate quickly a similarity to a query vector even when the number of dimensions of a target vector is large. The similarity calculation system is configured to: acquire a plurality of first target vectors; generate a plurality of second target vectors having a smaller number of dimensions than the plurality of first target vectors by subjecting each of the plurality of first target vectors to predetermined processing; acquire, based on the plurality of second target vectors, a plurality of clusters each including at least one of the plurality of first target vectors and at least one of the plurality of the second target vectors, each of the at least one second target vector corresponding to one of the at least one first target vector; and calculate a similarity between each of the at least one first target vector belonging to one or more clusters selected based on a given query vector having the same number of dimensions as the at least one first target vector, and the given query vector.

6 Claims, 9 Drawing Sheets

(51) Int. Cl.
*G06F 16/28* (2019.01)
*G06F 16/35* (2019.01)

(56) References Cited

U.S. PATENT DOCUMENTS

| | | | | |
|---|---|---|---|---|
| 2010/0125559 | A1* | 5/2010 | Hadjieleftheriou | ............................ G06F 17/30469 707/706 |
| 2010/0131863 | A1* | 5/2010 | Wexler | .................... G06Q 10/10 715/753 |
| 2010/0223258 | A1* | 9/2010 | Ghahramani | ..... G06F 17/30247 707/723 |
| 2014/0258032 | A1* | 9/2014 | Psota | ...................... G06Q 30/02 705/26.35 |
| 2015/0052139 | A1 | 2/2015 | Cevahir et al. | |
| 2015/0095185 | A1* | 4/2015 | Katukuri | ............ G06Q 30/0631 705/26.7 |

OTHER PUBLICATIONS

Yohei Sobu, Hideaki Goto, Binary Tree-Based Accuracy-Keeping Clustering Using CDA for Very Fast Japanese Character Recognition [online], Proceedings of the 12th IAPR Conference on Machine Vision Applications (MVA2011), Jun. 15, 2011, p. 299-302 [retrieved on Apr. 24, 2014]URL:http://www.mva-org.jp/Proceedings/2011CD/papers/09-18.pdf>.

Koichi Kise, "Dai 2 Kai Multimedia Kensaku no Saisentan—Daikibo Seishi Gaza DB no Kensaku", The Journal of the Institute of Image Information and Television Engineers, Feb. 1, 2010 (Feb. 1, 2010), vol. 64, No. 2, pp. 192 to 197.

B. Barla Cambazoglu et al., "Effect of Inverted Index Partitioning Schemes on Performance of Query Processing in Parallel Text Retrieval Systems", Proc. of the 21st International Conference on Computer and Information Sciences (ISCIS 2006), LNCS, vol. 4263, pp. 717-725. The year of publication is sufficiently earlier than the effective U.S. filing date and any foreign priority date so that the particular month of publication is not in issue.

Pentti Kanerva et al., "Random Indexing of Text Samples for Latent Semantic Analysis", Proc. of the 22nd Annual Conference of the Cognitive Science Society, vol. 1036, 2000. The year of publication is sufficiently earlier than the effective U.S. filing date and any foreign priority date so that the particular month of publication is not in issue.

English Translation of International Search Report for PCT/JP2014/059470 dated May 13, 2014.

* cited by examiner

FIG.4

$$y = R \times x$$

where $$y = \begin{bmatrix} s_1 \\ s_2 \\ \vdots \\ s_n \end{bmatrix}, \quad R = \begin{bmatrix} r_{1,1} & r_{1,2} & \cdots & r_{1,m} \\ r_{2,1} & r_{2,2} & \cdots & r_{2,m} \\ \vdots & \vdots & & \vdots \\ r_{n,1} & r_{n,2} & \cdots & r_{n,m} \end{bmatrix}, \quad x = \begin{bmatrix} w_1 \\ w_2 \\ \vdots \\ w_m \end{bmatrix}$$

FIG.5

$$s_1 = w_1 \times r_{1,1} + w_2 \times r_{1,2} + \cdots + w_m \times r_{1,m}$$
$$s_2 = w_1 \times r_{2,1} + w_2 \times r_{2,2} + \cdots + w_m \times r_{2,m}$$
$$\vdots$$
$$s_n = w_1 \times r_{n,1} + w_2 \times r_{n,2} + \cdots + w_m \times r_{n,m}$$

FIG.6

| 1  | 1 | -1 | 0  | ... | 0  |
|----|---|----|----|-----|----|
| -1 | 0 | 1  | 0  | ... | 1  |
| 0  | 0 | 1  | -1 | ... | 0  |
| ⋮  | ⋮ | ⋮  | ⋮  |     | ⋮  |
| 0  | 1 | -1 | 0  | ... | -1 |

FIG.7

$$Y = R \times X$$

$Y$:

| $s_{1,1}$ | $s_{1,2}$ | $\cdots$ | $s_{1,p}$ |
|---|---|---|---|
| $s_{2,1}$ | $s_{2,2}$ | $\cdots$ | $s_{2,p}$ |
| $\vdots$ | $\vdots$ | | $\vdots$ |
| $s_{n,1}$ | $s_{n,2}$ | $\cdots$ | $s_{n,p}$ |

$R$:

| $r_{1,1}$ | $r_{1,2}$ | $\cdots$ | $r_{1,m}$ |
|---|---|---|---|
| $r_{2,1}$ | $r_{2,2}$ | $\cdots$ | $r_{2,m}$ |
| $\vdots$ | $\vdots$ | | $\vdots$ |
| $r_{n,1}$ | $r_{n,2}$ | $\cdots$ | $r_{n,m}$ |

$X$:

| $w_{1,1}$ | $w_{1,2}$ | $\cdots$ | $w_{1,p}$ |
|---|---|---|---|
| $w_{2,1}$ | $w_{2,2}$ | $\cdots$ | $w_{2,p}$ |
| $\vdots$ | $\vdots$ | | $\vdots$ |
| $w_{m,1}$ | $w_{m,2}$ | $\cdots$ | $w_{m,p}$ |

FIG.8

| VECTOR NUMBER | TARGET VECTOR | CLUSTER NUMBER | REDUCED TARGET VECTOR |
|---|---|---|---|
| 0001 | (1,0,0,2,0,0,0,⋯) | 1 | (1,3, ⋯) |
| 0002 | (3,0,1,0,0,0,1,0,⋯) | 1 | (4,0, ⋯) |
| 0003 | (1,1,0,2,0,0,0,0,1,⋯) | 1 | (−2,−1,⋯) |
| 0004 | (0,0,0,1,0,1,0,1,⋯) | 2 | (1,−3,⋯) |

FIG.9

| CLUSTER NUMBER | ELEMENT NUMBER | PAIR CONSISTING OF TARGET VECTOR AND ELEMENT VALUE |
|---|---|---|
| 1 | 1 | (x1,1), (x2,3), (x3,1) |
| 1 | 2 | (x3,1) |
| 1 | 3 | (x2,1) |
| 1 | 4 | (x1,2), (x3,2) |
| ⋮ | ⋮ | ⋮ |
| 2 | 1 | (x5,1) |
| ⋮ | ⋮ | ⋮ |

SIMILARITY CALCULATION SYSTEM, METHOD OF CALCULATING SIMILARITY, AND PROGRAM

CROSS REFERENCE TO RELATED APPLICATIONS

This application is a National Stage of International Application No. PCT/JP2014/059470 filed on Mar. 31, 2014. The contents of the above document is incorporated herein by reference in its entirety.

TECHNICAL FIELD

The present invention relates to a similarity calculation system, a method of calculating a similarity, and a program.

BACKGROUND ART

There are similarity calculation systems configured to calculate which one of a plurality of target vectors is similar to a given query vector. Such a system may be used, for example, to search for users having a similar preference by setting so that each vector represents a preference of a user, or to search for similar documents by setting so that each vector represents a characteristic of a document.

In this case, when there are a large number of target vectors, it takes time to determine the target vector that is most similar to the query vector. In order to solve this problem, in Patent Literature 1, there is disclosed a method in which the target vectors are clustered and a representative vector is calculated for each cluster. According to the method, when a query vector is given, a similarity between the query vector and each representative vector is calculated, and the most similar cluster is selected based on the calculated result. Further, the target vector most similar to the query vector is determined by calculating the similarity between each of the target vectors belonging to the selected cluster and the query vector.

CITATION LIST

Patent Literature

[PTL 1] JP 2013-65146 A

SUMMARY OF INVENTION

Technical Problem

According to the related art described above, the number of similarity calculations can be reduced and the time for determining the target vector most similar to the query vector can be shortened. However, when the number of dimensions of the target vectors is large, a long time is taken in order to cluster the target vectors.

The present invention has been created in view of the problem described above. It is an object of the present invention to provide a similarity calculation system, a method of calculating a similarity, and a program, which are capable of quickly calculating a similarity to a query vector even when the number of dimensions of a target vector is large.

Solution to Problem

In order to solve the problem described above, a similarity calculation system according to one embodiment of the present invention includes: first target vector acquisition means for acquiring a plurality of first target vectors; second target vector generation means for generating a plurality of second target vectors having a smaller number of dimensions than the plurality of first target vectors by subjecting each of the plurality of first target vectors to predetermined processing; clustering means for acquiring, based on the plurality of second target vectors, a plurality of clusters each including at least one of the plurality of first target vectors and at least one of the plurality of the second target vectors, each of the at least one second target vector corresponding to one of the at least one first target vector; and similarity calculation means for calculating a similarity between each of the at least one first target vector belonging to one or more clusters selected based on a given query vector having the same number of dimensions as the at least one first target vector, and the given query vector.

Further, a program according to one embodiment of the present invention causes a computer to function as: target vector acquisition means for acquiring a plurality of first target vectors; second target vector generation means for generating a plurality of second target vectors having a smaller number of dimensions than the plurality of first target vectors by subjecting each of the plurality of first target vectors to predetermined processing; clustering means for acquiring, based on the plurality of second target vectors, a plurality of clusters each including at least one of the plurality of first target vectors and at least one of the plurality of the second target vectors, each of the at least one second target vector corresponding to one of the at least one first target vector; and similarity calculation means for calculating a similarity between each of the at least one first target vector belonging to one or more clusters selected based on a given query vector having the same number of dimensions as the at least one first target vector, and the given query vector.

Further, a method of calculating a similarity according to one embodiment of the present invention includes: a target vector acquisition step of acquiring a plurality of first target vectors; a second target vector generation step of generating a plurality of second target vectors having a smaller number of dimensions than the plurality of first target vectors by subjecting each of the plurality of first target vectors to predetermined processing; a clustering step of acquiring, based on the plurality of second target vectors, a plurality of clusters each including at least one of the plurality of first target vectors and at least one of the plurality of the second target vectors, each of the at least one second target vector corresponding to one of the at least one first target vector; and a similarity calculation step of calculating a similarity between each of the at least one first target vector belonging to one or more clusters selected based on a given query vector having the same number of dimensions as the at least one first target vector, and the given query vector.

According to the one embodiment of the present invention, it is possible to quickly calculate the similarity to the query vector even when the number of dimensions of the first target vector is large.

In one aspect of the present invention, the similarity calculation system may further include: second query vector generation means for generating a second query vector having a smaller number of dimensions than the given query vector by subjecting the given query vector to the predetermined processing; and cluster selection means for selecting one or more the clusters based on the second query vector.

In one aspect of the present invention, the similarity calculation system may further include inverted index generation means for generating an inverted index for each of the plurality of clusters based on each of the at least one first target vector belonging to the each of the plurality of clusters, and the similarity calculation means may calculate the similarity between each of the at least one first target vector and the given query vector based on the generated inverted index.

In one aspect of the present invention, the second target vector generation means may calculate each vector element of each of the plurality of second target vector by calculating each inner product between each of the plurality of first target vector and a conversion vector that includes a plurality of randomly determined vector elements, and that has a smaller number of dimensions than the plurality of first target vector and the same number of dimensions as the plurality of first target vector.

In one aspect of the present invention, the second target vector generation means may generate, when the first target vector is to be added, the second target vector corresponding to the first target vector to be added by subjecting the first target vector to be added to the predetermined processing, and the clustering means may select the cluster to which the first target vector to be added belongs based on the newly generated second target vector.

In one aspect of the present invention, the second target vector generation means may: further include means for increasing, when a dimension-added target vector obtained by adding a number of dimensions to the first target vector is to be added, the number of dimensions of the conversion vector by the same number of dimensions as the added number of dimensions; and newly generate the second target vector corresponding to the dimension-added target vector based on the conversion vector having an increased number of dimensions, and the clustering means may select the cluster to which the added dimension-added target vector belongs based on the newly generated second target vector.

BRIEF DESCRIPTION OF DRAWINGS

FIG. 4 is a diagram for showing an example of processing for converting target vectors.

FIG. 5 is a diagram for showing an example of a calculation for converting the target vector.

FIG. 6 is a diagram for showing an example of a value of each element in a conversion matrix.

FIG. 7 is a diagram for showing an example of processing for converting a plurality of target vectors.

FIG. 8 is a diagram for showing an example of information on the target vectors and the like stored in a vector storage unit.

FIG. 9 is a diagram for showing an example of an inverted index.

DESCRIPTION OF EMBODIMENTS

An embodiment of the present invention is now described with reference to the drawings. Constituent elements in the following description having the same function as each other are denoted with the same reference symbol, and a duplicate description of such constituent elements is omitted.

A similar search system according to one embodiment of the present invention includes a similar search server 1. The similar search server 1 is a server computer. The similar search server 1 may be connected via a network to a personal computer, a smartphone, and the like, which is configured to issue an instruction to start a similar search.

Figure 1:
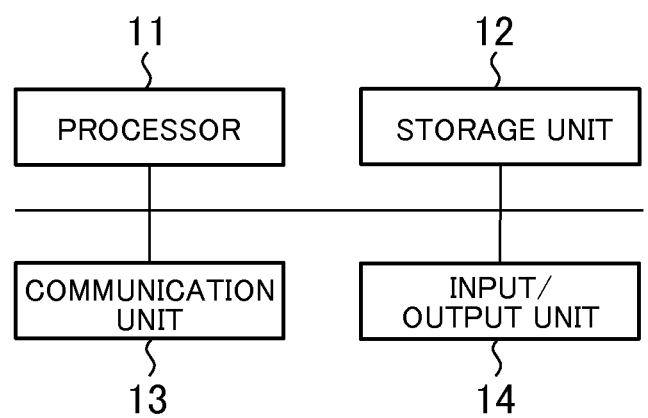
FIG. 1 is a diagram for illustrating an example of a hardware configuration of a similar search server according to one embodiment of the present invention.

FIG. 1 is a diagram for illustrating an example of a hardware configuration of the similar search server 1. The similar search server 1 includes a processor 11, a storage unit 12, a communication unit 13, and an input/output unit 14.

The processor 11 is configured to operate based on programs stored in the storage unit 12. Further, the processor 11 is configured to control the communication unit 13 and the input/output unit 14. Note that, the above-mentioned programs may be provided via the Internet and the like, or may be provided by being stored in a computer-readable storage medium, such as a flash memory or a digital versatile disc read-only memory (DVD-ROM).

The storage unit 12 is constructed from a memory element, such as a random-access memory (RAM) or a flash memory, or from a hard disk drive. The storage unit 12 stores the above-mentioned programs. Further, the storage unit 12 stores information input from various units and calculation results.

The communication unit 13, which executes a function for communicating to/from another apparatus, is constructed from, for example, an integrated circuit, a connector terminal, and the like of a wired local area network (LAN). The communication unit 13 is configured to, under the control of the processor 11, input information received from another apparatus to the processor 11 and the storage unit 12, and to transmit information to another apparatus.

The input/output unit 14 is constructed from, for example, a video controller configured to control display output means and a controller configured to acquire data from an input device. Examples of the input device include a keyboard, a mouse, a touch panel, and the like. The input/output unit 14 is configured to, under the control of the processor 11, output display data to a display output device, and to acquire data input by a user operating the input device. The display output device is, for example, an externally connected display apparatus.

Figure 2:
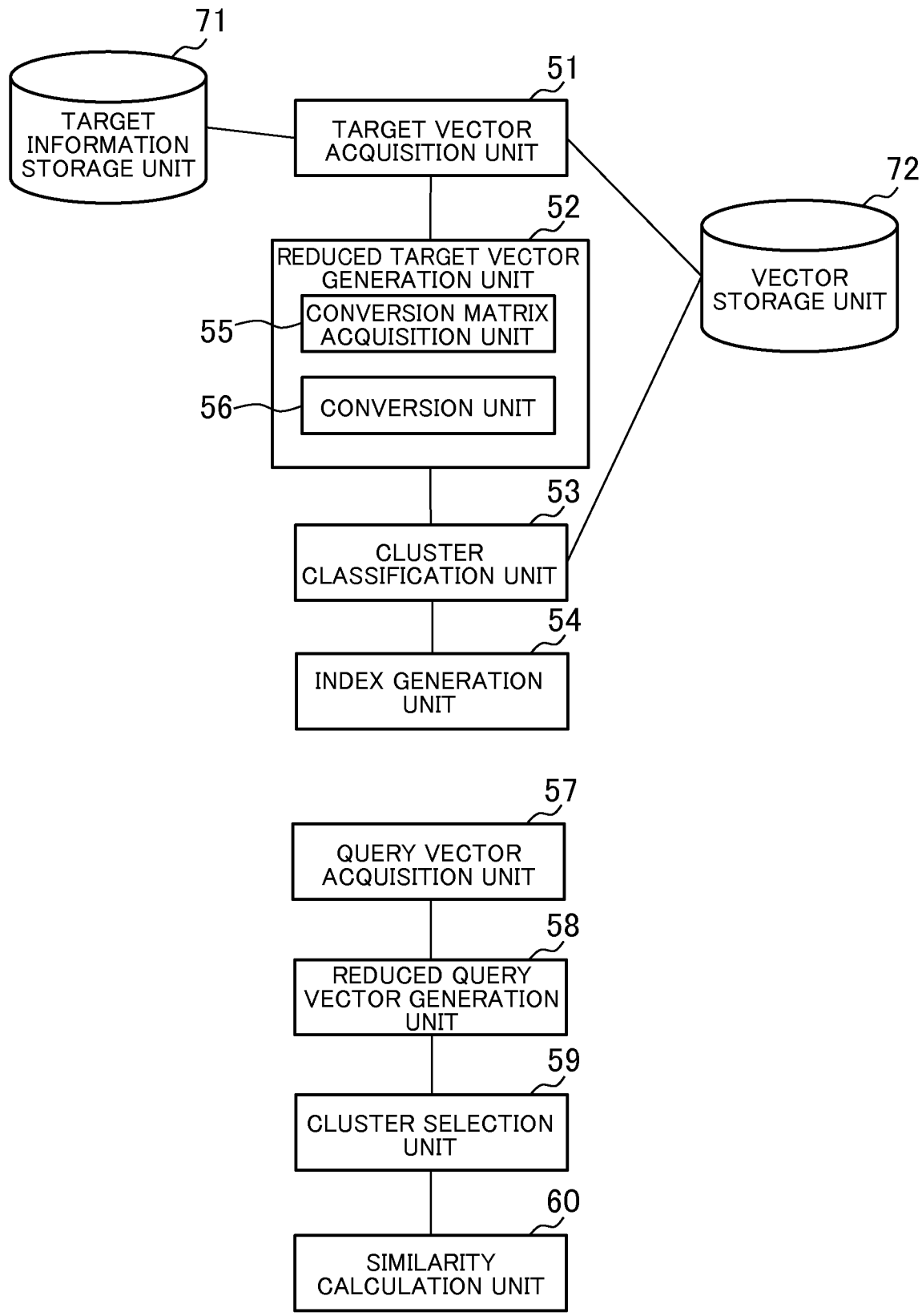
FIG. 2 is a block diagram for illustrating functions realized by the similar search server.

FIG. 2 is a block diagram for illustrating functions realized by the similar search server 1. Functionally, the similar search server 1 includes a target vector acquisition unit 51, a reduced target vector generation unit 52, a cluster classification unit 53, an index generation unit 54, a query vector acquisition unit 57, a reduced query vector generation unit 58, a cluster selection unit 59, and a similarity calculation unit 60. Those functions are implemented by the processor 11 executing a program stored in the storage unit 12, and controlling the communication unit 13 and the input/output unit 14. The reduced target vector generation unit 52 functionally includes a conversion matrix acquisition unit 55 and a conversion unit 56. Further, the similar search server 1 includes a target information storage unit 71 and a vector storage unit 72. The target information storage unit 71 stores information on a document, the user, and the like, on which the similar search is to be carried out. The vector storage unit 72 stores a plurality of target vectors. In this case, each of the target vectors is a characteristic vector generated based on the corresponding information on the document, the user, and the like. The target information storage unit 71 and the vector storage unit 72 are mainly constructed from the storage unit 12. However, those storage units may be constructed from a storage unit and the like in another server, and the storage unit and the like in another server may send and receive the stored information via a network with each of the functions in the similar search server 1.

In this embodiment, broadly speaking, there are three types of processing that are carried out. The first type of processing is processing for searching for target vectors that are similar to the query vector. The second type of processing is processing for creating the clusters in which the target vectors are to be classified and the index in order to prepare for the search for target vectors. The third type of processing is processing for, when a target vector is to be added (a target vector to be added is hereinafter referred to as an added target vector), classifying the added target vector into any one of the clusters, and correcting the index. The first type of processing is carried out by the similarity calculation unit 57, the reduced query vector generation unit 58, the cluster selection unit 59, and the similarity calculation unit 60. The second and third types of processing are carried out by the target vector acquisition unit 51, the reduced target vector generation unit 52, the cluster classification unit 53, and the index generation unit 54.

Figure 3:
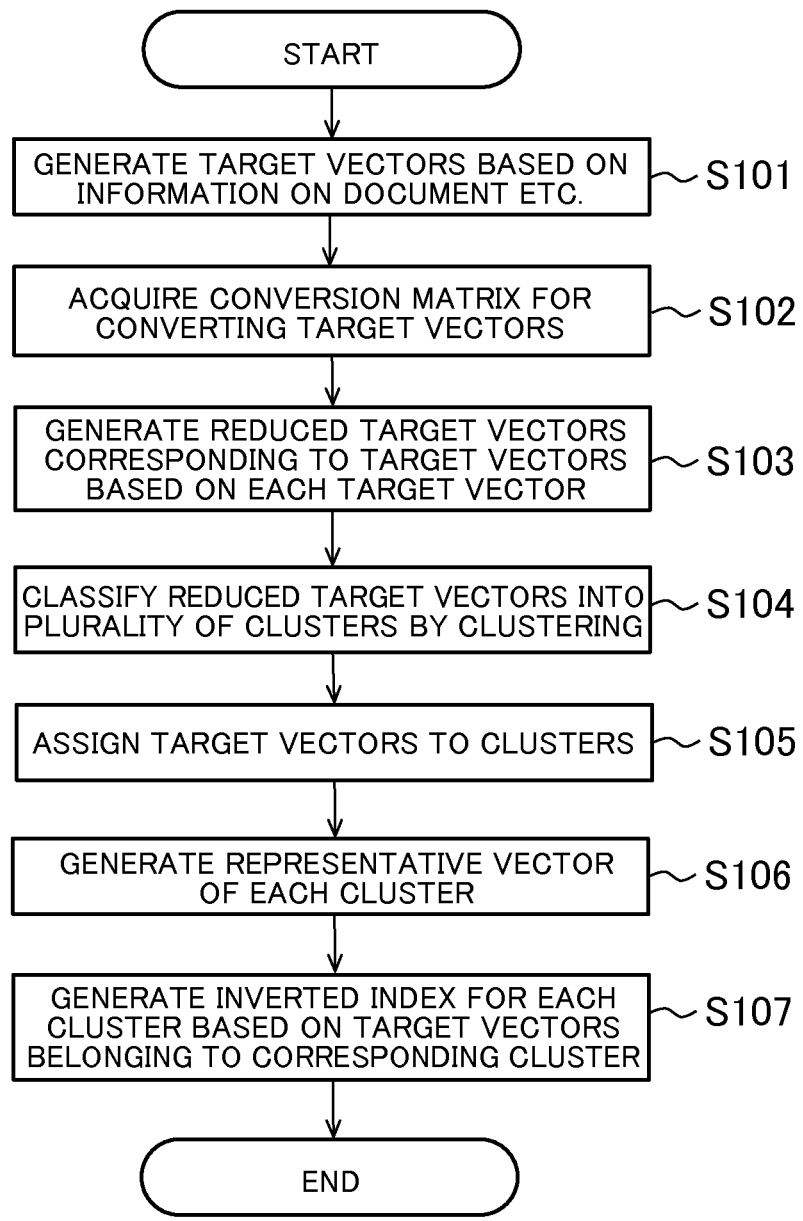
FIG. 3 is a flowchart for illustrating an example of processing for creating an index by classifying target vectors into a plurality of clusters.

First, the processing for creating the clusters and indices in which the target vectors are to be classified is described. FIG. 3 is a flowchart for illustrating an example of processing for creating an index by classifying the target vectors into a plurality of clusters. Each of the functions is now described along with this processing flow.

The target vector acquisition unit 51 is mainly implemented by the processor 11 and the storage unit 12. The target vector acquisition unit 51 is configured to acquire a plurality of target vectors. More specifically, the target vector acquisition unit 51 generates target vectors based on information on the document, the user, and the like stored in the target information storage unit 71 (Step S101). Further, the target vector acquisition unit 51 stores the generated target vectors in the vector storage unit 72. For example, when target vectors are generated from an electronic document, the target vectors correspond to a document, and each of a plurality of elements included in the target vectors corresponds to a single term. Note that, the number of dimensions of the target vectors is the same as the number of elements of the target vectors. Further, the values of the elements of the target vectors are a score representing an appearance frequency of the term in the corresponding document (e.g., TF-IDF value). The TF-IDF value for a given term in a given document is 0 when that term does not appear in the document. Further, even if a term appears in a document, if the term is considered to be a common term that appears in many documents, the TF-IDF value is smaller than when the term is not a common term. The target vectors may also be generated from each of a plurality of pieces of user information. In this case, the elements of the target vectors may correspond to an attribute of the user information (information representing an attribute of the user). When the attribute is capable of taking a plurality of values, an element corresponding to each value of the attribute may exist. Because specific methods of generating target vectors based on a document or a user attribute are known, a detailed description thereof is omitted here.

The reduced target vector generation unit 52 is mainly realized by the processor 11 and the storage unit 12. The conversion matrix acquisition unit 55 included in the reduced target vector generation unit 52 acquires a conversion matrix R for converting each of the target vectors into a reduced target vector having a smaller number of dimensions than the corresponding target vector (Step S102). Further, the conversion unit 56 included in the reduced target vector generation unit 52 converts each of the target vectors into a reduced target vector having a smaller number of dimensions than the corresponding target vector (Step S103), and stores the converted reduced target vectors in the vector storage unit 72.

FIG. 4 is a diagram for showing an example of processing for converting target vectors. In FIG. 4, the conversion of one target vector x ($w_1, \ldots, w_m$) into a reduced target vector y ($s_1, \ldots, s_n$) based on the conversion matrix R is shown. In this case, the number of dimensions of the target vector is m, the number of dimensions of the reduced target vector is n, and n is sufficiently smaller than m (e.g., n is less than ¼ of m). FIG. 5 is a diagram for showing a calculation for converting the target vector. As can be seen from FIG. 5, the processing calculates a t-th (t being an integer of 1 or more to n or less) element of the reduced target vector y by multiplying each of the values from the first to the m-th elements of the target vector x by each of the values of the elements from the first to the m-th elements of a column t in the conversion matrix R, and integrating the obtained products. Considering that each column in the conversion matrix R is a conversion vector of the m-th dimension, the value of the t-th element of the reduced target vector y can be said to be the value of the inner product between the target vector and the conversion vector. In this case, a u-th (u being an integer of 1 or more to n or less) conversion vector is ($r_{u,1}, r_{u,2}, \ldots, r_{u,m}$).

Note that, in the processing for converting the target vectors into reduced target vectors, the reduced target vector generation unit 52 may be configured to acquire the values of the elements of the reduced target vectors by integrating the products of the elements having a non-zero value among the elements of the target vector and the elements in the conversion matrix R corresponding to those elements. In this case, of the plurality of rows in the conversion matrix R, only the rows corresponding to elements having a non-zero value among the plurality of elements of the target vectors are used for this calculation.

FIG. 6 is a diagram for showing an example of a value of each element in the conversion matrix R. The value of each element in the conversion matrix R is randomly determined using random numbers. In the example shown in FIG. 6, there are three values that the elements can take, namely, {−1, 0, 1}. The positions at which each of these values appears are random. Therefore, of the three values, the value 1 and the value −1 appear an equal number of times. For example, ⅙ of the elements in the conversion matrix are the value 1, ⅙ are the value −1, and the remaining ⅔ of the elements are the value 0. Stated further, the conversion matrix acquisition unit 55 generates the conversion matrix R by randomly arranging a predetermined number of 1s and −1s among the elements in each of the columns of the conversion matrix R, and arranging 0s for the remaining elements. From the perspective of accuracy, it is preferred that the ratio of the number of elements having the value of 0 to the total number of elements in the conversion matrix R be from 0 to about ⅔. However, the ratio may be set to more than ⅔.

FIG. 7 is a diagram for showing an example of processing for converting a plurality of target vectors. The processing for converting a plurality of target vectors into a plurality of reduced target vectors can be represented by a matrix operation. Specifically, a reduced target matrix Y in which each of the rows are a reduced target vector can be determined by calculating a product of the conversion matrix R and a target matrix X in which each of the rows is a target vector. The conversion unit 56 is configured to acquire a plurality of reduced target vectors by executing this matrix operation processing.

Note that, in this embodiment, the reduced target vectors are generated using the random conversion matrix R. However, the reduced target vectors may be generated using another method. For example, the reduced target vector generation unit 52 may be configured to convert the target vectors into reduced target vectors having a smaller number of dimensions using a principal components analysis (PCA) method.

The cluster classification unit 53 is mainly realized by the processor 11 and the storage unit 12. The cluster classification unit 53 is configured to acquire a plurality of clusters to which the target vectors and the reduced target vectors corresponding to those target vectors belong based on the reduced target vectors. More specifically, when the reduced target vectors are generated, first, the cluster classification unit 53 classifies the plurality of reduced target vectors into a plurality of clusters by clustering the plurality of reduced target vectors (Step S104). The cluster classification unit 53 may perform cluster classification using a known clustering method, such as a k-means method.

Next, the cluster classification unit 53 assigns to each cluster the target vectors corresponding to the reduced target vectors belonging to that cluster (Step S105). In this case, the target vectors corresponding to the reduced target vectors are the target vectors before the conversion into the reduced target vectors. As a result of this processing, the reduced target vectors and the target vectors belong to each cluster.

FIG. 8 is a diagram for showing an example of information on the target vectors and the like stored in the vector storage unit 72. Each record of information shown in FIG. 8 includes a vector number specifying a target vector and a reduced target vector, and a cluster number, which is information representing the cluster to which the target vector and the reduced target vector each belong. The target vectors and the reduced target vectors correspond to each other in a one-to-one relationship, in which one target vector and the reduced target vector corresponding to that one target vector belong to the same cluster. Therefore, each record has only one cluster number. In the case of the data structure of the vector storage unit 72 shown in FIG. 8, the processing described in Step S105 is specifically processing for causing the cluster number temporarily stored in a memory regarding the reduced target vector to be reflected in each record in the vector storage unit 72. Note that, the reduced target vectors and the target vectors may be managed separately. For example, the target vectors and the reduced target vectors may be associated with each other based on vector numbers by managing the reduced target vectors based on pairs of records including the vector number, a reduced target vector, and the cluster number. Note that, in FIG. 8, the values of the elements of the target vectors and the values of the elements of the reduced target vectors are all integers. However, in actual practice, the values may be non-integers.

Each vector is managed so that the relative similarity with respect to other vectors is maintained before and after the processing for converting the target vectors. The conversion algorithm used for reducing the number of dimensions of the target vectors is an algorithm capable of maintaining this relative similarity. As a result, the clusters of the reduced target vectors can also be used as clusters of the original target vectors.

Next, the cluster classification unit 53 generates a representative vector of each cluster based on the reduced target vectors included in each cluster (Step S106). The representative vectors of the clusters are a characteristic vector that indicates the characteristic of the target vectors and that has the same number of dimensions as the reduced target vectors. For example, the representative vector may be the center of gravity of the plurality of reduced target vectors included in the cluster, or the reduced target vector closest to the center of gravity. The representative vector is used to select a cluster similar to the query vector. The cluster classification unit 53 stores the representative vectors in the storage unit 12.

When reduced target vectors are used for clustering instead of target vectors, the number of dimensions decreases, and as a result, the processing time in order to perform the clustering is shortened. Further, because the distance between the reduced target vectors converted based on the random conversion matrix R tends to be a value that approximately matches the distance between the corresponding target vectors, deterioration in accuracy due to using the distance between the reduced target vectors is suppressed.

The index generation unit 54 is mainly realized by the processor 11 and the storage unit 12. When the target vectors have been classified into clusters, the index generation unit 54 generates an inverted index for each cluster based on the target vectors belonging to the cluster (Step S107).

FIG. 9 is a diagram for showing an example of an inverted index. The inverted index includes a record provided for each pair of a cluster and an element. Each record includes an element number, which is information specifying the element to act as a key attribute, and a list of pairs consisting of a target vector including an element and the value of that element in the target vector. In FIG. 9, in the pair (x1, 1) consisting of a target vector and an element value in the record having the cluster number "1" and the element number "1", x1 represents the target vector having the vector number "1", and "1" represents the value of the first element of that target vector.

The inverted index is an index for increasing processing efficiency when calculating the similarity between the target vectors in the cluster and the query vector. Using the inverted index enables, for an element having a value in the query vector, the contribution to similarity of a target vector having a value for that element to be quickly calculated. The inverted index may be created based on a known method, and hence a detailed description thereof is omitted here.

Figure 10:
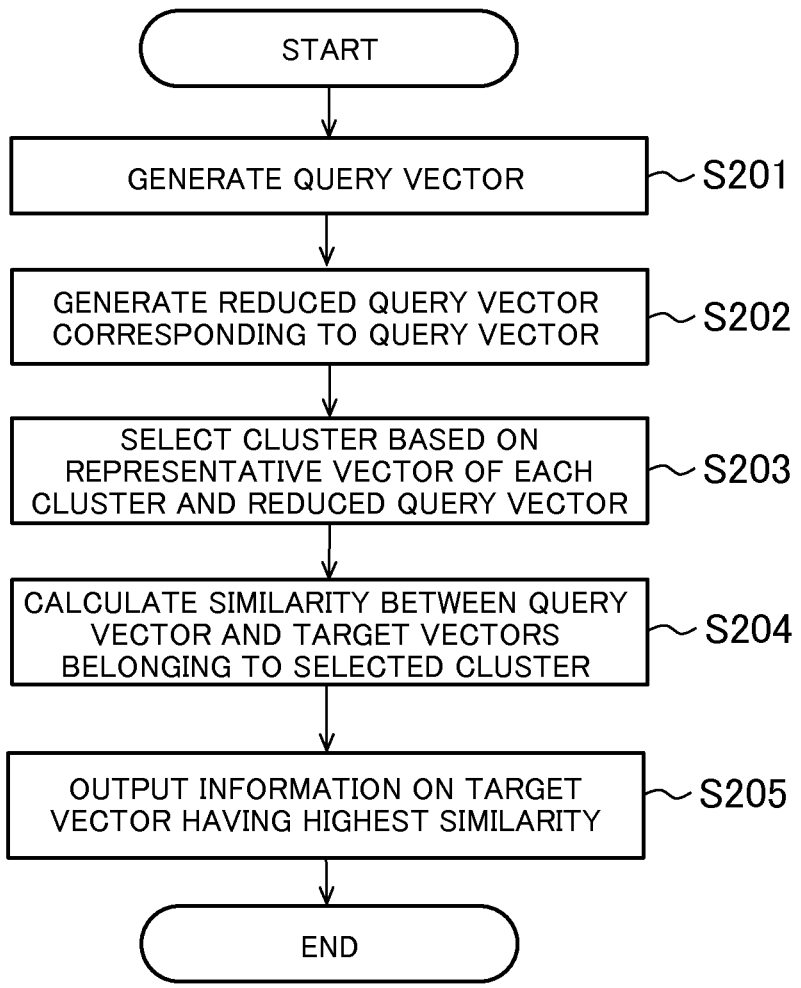
FIG. 10 is a diagram for illustrating an example of a processing flow for searching for similar target vectors using a query vector.

Next, processing for searching for the target vectors similar to the query vector is described. FIG. 10 is a diagram for illustrating an example of a processing flow for searching for similar target vectors using a query vector. Each of the functions is now described along with this processing flow.

The query vector acquisition unit 57 is mainly implemented by the processor 11, the storage unit 12, and the communication unit 13. The query vector acquisition unit 57 acquires the query vector by generating a query vector (Step S201). The query vector acquisition unit 57, for example, acquires an electronic document, the user information, and the like from a user terminal and the like connected via a network, and generates the query vector based on the electronic document, the user information, and the like. The method of generating the query vector by the query vector acquisition unit 57 is the same as the method of generating the target vectors based on the electronic document, the user information, and the like, by the target vector acquisition unit 51.

The reduced query vector generation unit 58 is mainly realized by the processor 11 and the storage unit 12. The reduced query vector generation unit 58 generates a reduced query vector corresponding to the query vector (Step S202). The method of generating the reduced query vector by the reduced query vector generation unit 58 is the same as the method of generating the reduced target vectors based on the target vectors by the reduced target vector generation unit 52.

The cluster selection unit 59 is mainly realized by the processor 11 and the storage unit 12. The cluster selection unit 59 is configured to select a cluster based on the generated reduced query vector. More specifically, the cluster selection unit 59 selects a cluster based on the reduced query vector and the representative vectors representing each of the plurality of clusters. During this process, the cluster selection unit 59 calculates the distance between the reduced query vector and each of the representative vectors, and selects the cluster corresponding to the representative vector having the smallest distance to the reduced query vector. Note that, the cluster selection unit 59 may also be configured to select clusters corresponding to several of a plurality of representative vectors having a small distance.

The similarity calculation unit 60 is mainly implemented by the processor 11 and the storage unit 12. The similarity calculation unit 60 calculates the similarity between each of a plurality of target vectors belonging to the selected cluster and the query vector before the conversion (Step S204). In this embodiment, the similarity calculation unit 60 is configured to calculate the similarity between the query vector and the target vectors using the inverted index generated by the index generation unit 54. Specifically, first, the similarity calculation unit 60 initializes a cumulative variable representing the value of the similarity for each of the plurality of target vectors belonging to the cluster. Next, the similarity calculation unit 60 uses the inverted index to acquire, for each of the plurality of elements having a value set in the query vector, the target vectors which corresponds to those elements (and whose element value is not 0) and the value of those elements of the target vectors, and adds the product of the values of those elements of the query vector and the values of the elements of the target vectors to the cumulative variable of those target vectors. When this processing is carried out, the cumulative variable of each of the target vectors (corresponding to the inner product between the query vector and the target vectors) is the value of the similarity. Note that, the similarity calculated by the similarity calculation unit 60 may be a cosine similarity between the query vector and each of the target vectors belonging to the selected cluster. When vectors normalized in advance are used as the target vectors and the query vector, the value of the cumulative variable using the above-mentioned inverted index is equivalent to the value of the cosine similarity.

Further, the similarity calculation unit 60 selects the target vector having the highest similarity, and outputs information on the target vector having the highest similarity (Step S205). The information on the target vector may be information on the target vector itself, or may be information on the original document and the like from which the target vector is generated. Further, the similarity calculation unit 60 may output information on the document and the like to display output means connected to the similar search server 1, or may transmit information on the document and the like to a user terminal and the like via a network.

When the target vectors have been converted into reduced target vectors, in order to determine the ranking of the similarity of the document and the like, normally consideration is given to calculating the similarity using the reduced target vectors. However, when searching in the clusters, accuracy deteriorates when reduced target vectors having a reduced amount of information are used. As a result, it may be impossible to find the target vector most similar to the query vector. In this embodiment, the use of reduced target vectors for the clustering and the use of pre-conversion target vectors for the calculation of the similarity in the clusters enable the time taken to perform the clustering to be reduced and the search accuracy using the clusters to be improved. Further, the use of reduced target vectors for cluster selection and the use of target vectors for the calculation of the post-selection similarity enable the calculation to be carried out highly accurately while taking into consideration the characteristic of the clusters, and processing to be carried out more quickly.

Figure 11:
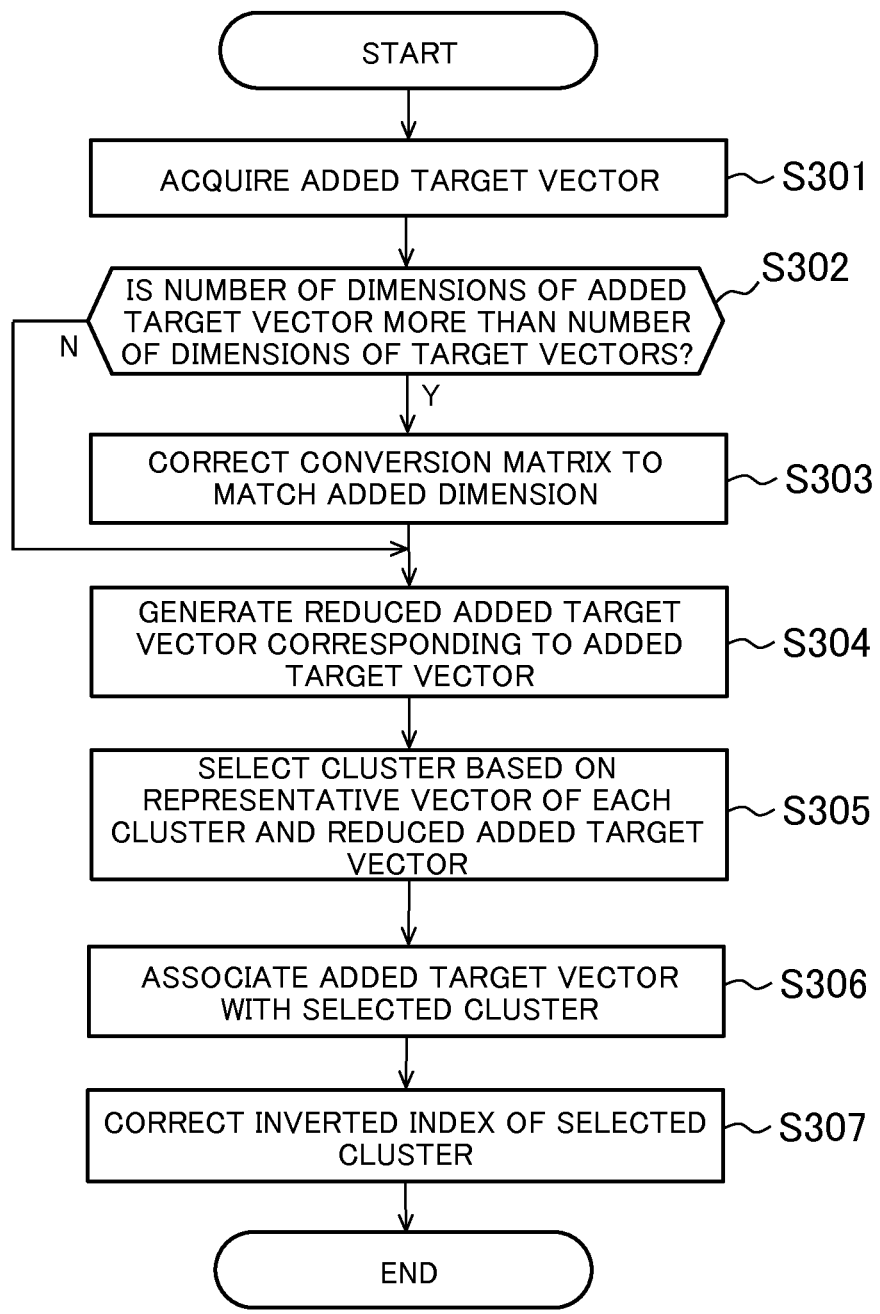
FIG. 11 is a diagram for illustrating an example of processing for classifying an added target vector into a cluster and creating an index.

Next, the processing for, when an added target vector is to be added, classifying the added target vector into any one of the clusters, and correcting the index, is described. FIG. 11 is a diagram for illustrating an example of processing for classifying an added target vector into a cluster and creating an index.

First, the target vector acquisition unit 51 acquires the added target vector (Step S301). When information on the document and the like to serve as the basis of the added target vector is given, the target vector acquisition unit 51 is configured to acquire the added target vector based on the same method as that in Step S101.

In this case, when a new term appears in the document serving as the basis of the added target vector, the number of dimensions of the added target vector may be more than the number of dimensions of the target vectors already classified into clusters. How such a case is handled is now described below.

When the number of dimensions of the added target vector is equal to or less than the number of dimensions of the target vectors already classified into clusters (N in Step S302), the processing of Step S303 is not performed. On the other hand, when the number of dimensions of the added target vector is more than the number of dimensions of the target vectors already classified into clusters (Y in Step S302), the conversion matrix acquisition unit 55 included in the reduced target vector generation unit 52 corrects the conversion matrix R to match the added dimension (Step S303). More specifically, the conversion matrix acquisition unit 55 inserts, into the conversion matrix R, a row (e.g., the last row) corresponding to the position (e.g., the last column) of the element added for the first time by the added target vector. The row is formed from the elements taking the product of the added elements of the added target vector in the elements of the plurality of conversion vectors. Similar to the method of determining the values of the elements in the original conversion matrix R, the same number of $-1$s and $1$s are randomly arranged in the elements of the row to be inserted into the conversion matrix R.

Then, the conversion unit 56 in the reduced target vector generation unit 52 converts the added target vector to generate a reduced added target vector (Step S304). The method of generating the reduced added target vector by the conversion unit 56 is the same as the method of generating the reduced target vectors based on the target vectors in Step S103.

Next, the cluster classification unit 53 selects the cluster to which the added target vector belongs based on the representative vector of each cluster and the reduced added target vector (Step S305). More specifically, the cluster classification unit 53 calculates the distance between the reduced added target vector and the representative vector of each cluster generated based on the reduced target vectors, and selects the cluster corresponding to the representative vector having the shortest distance as the cluster to which the reduced added target vector belongs. Then, the cluster classification unit 53 stores the added target vector in association with the selected cluster (Step S306). More specifically, the cluster classification unit 53 adds a record including information on the added target vector number, the elements of the added target vector, the cluster number associated with the added target vector, and the elements of the reduced target vectors in a target vector number field, a target vector field, a cluster number field, and a reduced target vector field, respectively. These process enables the added target vector to be classified in a cluster without needing to perform clustering from the start again.

Further, because the values of the elements in the conversion matrix R are randomly generated, a reduced added target vector can be generated by adding a row to the conversion matrix R even when the number of elements of the added target vector has increased for some reason, such as a new word being added. In addition, if the element corresponding to the new word is added to the pre-added target vectors, and the reduced target vectors are calculated using the conversion matrix R to which a row has been added, those reduced target vectors are the same as the reduced target vectors calculated before the element is added. The reason for this is because, for example, due to the fact that a term or the like corresponding to the element does not exist in the document or the like serving as the basis of the existing target vectors, the value of the element to be added to the existing target vectors is 0, and hence the values of the elements of the corresponding reduced target vectors are not changed by the value (i.e., 0) obtained by multiplying the values of the elements in the conversion matrix R by the value of the added element. Therefore, it is not necessary to re-calculate the reduced target vectors or to perform clustering again for the existing target vectors.

When the added target vector has been associated with the cluster, the index generation unit 54 corrects the inverted index of the selected cluster based on the added target vector (Step S307). More specifically, the index generation unit 54 adds pairs consisting of the added target vector and the element values of the added target vector to the list of pairs of element values of the target vectors in the record which is specified by the elements having a non-zero value among the elements of the added target vector as a key. Further, when a new element is added, the index generation unit 54 adds a record of that element.

Correcting the inverted index in the manner described above enables the similarity between the query vector and the target vectors belonging to any one of the clusters to be calculated even without creating the inverted index from the start again.

In this case, when the document or the like serving as the basis of the existing target vector is updated, the inverted index of the cluster to which the target vector that have been updated according to the update to the document belongs may be updated. For example, the following processing similar to processing for classifying the added target vector in a cluster and creating an index is carried out. First, when the document or the like serving as the basis of the target vectors is updated, the target vector acquisition unit 51 generates target vector updated based on the document. When the number of elements of the target vector has increased, the conversion matrix acquisition unit 55 corrects the conversion matrix R, and when the number of elements of the target vector has not increased, the conversion matrix acquisition unit 55 acquires the conversion matrix R that has already been generated. Next, the conversion unit 56 again converts the updated target vector into reduced target vector. Then, the cluster classification unit 53 selects the cluster to which the target vector belongs based on the representative vector of each cluster and the reduced target vector corresponding to the updated target vector. The index generation unit 54 then updates the inverted index of the selected cluster based on the updated target vector. Specifically, the index generation unit 54 deletes pairs including the pre-update target vector from the values of the pairs consisting of a target vector and an element value in the records of the inverted index, and adds a pair consisting of a target vector and an element value to the list of pairs of element values of the target vectors in the record which is specified by the elements having a non-zero value among the elements of the updated target vectors as a key.

In this case, when it is expected that the updated portion of the document or the like is a partial portion, the processing performed by the cluster classification unit 53 may be skipped because the updated target vector belongs to the cluster to which the pre-update target vector belonged. Further, the cluster classification unit 53 may again generate a representative vector based on the reduced target vector corresponding to the updated target vector. Note that, even in the processing for classifying the added target vector into any one of the clusters and correcting the index, the cluster classification unit 53 may generate the representative vector again after selecting the cluster to which the added target vector belongs.

Further, during the processing for searching for the target vectors similar to the query vector, the query vector may be used for cluster selection without converting the query vector into a reduced query vector. When the representative vectors have been generated based on the target vectors in advance, and the number of dimensions of the representative vectors is the same as the number of dimensions of the target vectors, the cluster selection unit 59 may select the cluster based on the query vector and the representative vectors. In this case, during the processing for creating the clusters in which the target vectors are to be classified and the index, the cluster classification unit 53 generates the representative vector of each cluster based on the target vectors included in each cluster. However, because clustering is carried out using reduced target vectors, it is preferred that the representative vectors be also reduced target vectors.

Note that, the functions of the target vector acquisition unit 51, the reduced target vector generation unit 52, the cluster classification unit 53, and the index generation unit 54 may be implemented by a processor and the like included in a different server from the similar search server 1. Cluster classification and inverted index creation may be carried out in parallel to the operation for searching for the target vectors similar to the query vector. A plurality of similar search servers may be present, and each of the similar search servers may store an inverted index corresponding to one or more clusters. The clusters corresponding to the inverted indices stored by each of the similar search servers may be a part of a plurality of clusters that have been clustered. In this case, a server including a dispatcher may store the conversion matrix R and the representative vectors (when the query vector is not converted, only the representative vectors), and the dispatcher may select the cluster based on the query vector and dispatch a query including the query vector to the similar search server storing the corresponding inverted index.

The invention claimed is:

1. An object search system, comprising:
at least one processor; and
at least one memory device that stores a plurality of instructions, which when executed by the at least one processor, causes the at least one processor to operate to:
acquire a plurality of first target vectors each of which has a first number of elements;
generate a plurality of second target vectors each of which has a second number of elements by subjecting each of the plurality of first target vectors to predetermined processing wherein the second number is smaller than the first number;
acquire, based on the plurality of second target vectors, a plurality of clusters each comprising at least one of the plurality of first target vectors and at least one of the plurality of the second target vectors, each of the at least one second target vector corresponding to one of the at least one first target vector; and
search, with the at least one processor, target vectors similar to a query vector which has a same number of elements as the plurality of first target vectors, comprising:
generate a second query vector having a same number of elements as the plurality of second target vectors by subjecting the query vector to the predetermined processing;
select one or more clusters from the plurality of clusters based on the second query vector;
calculate a similarity between each of the at least one first target vector belonging to the selected one or more clusters and the query vector; and
output an object indicated by one of the at least one first target vector having a highest calculated similarity,
wherein when executed by the at least one processor, the plurality of instructions cause the at least one processor to calculate each of the plurality of second target vectors by calculating a product between each of the plurality of first target vectors and a conversion matrix that includes a plurality of randomly determined vector elements wherein one of a number of rows and a number of columns in the conversion matrix is the first number and other of the number of rows and the number of columns in the conversion matrix is the second number.

2. The object search system according to claim 1, wherein when executed by the at least one processor, the plurality of instructions cause the at least one processor to operate to generate an inverted index for each of the plurality of clusters based on each of the at least one first target vector belonging to the each of the plurality of clusters,
wherein the similarity calculation between each of the at least one first target vector and the query vector is based on the generated inverted index.

3. The object search system according to claim 1, wherein when executed by the at least one processor, the plurality of instructions cause the at least one processor to operate to generate, when the first target vector is to be added, the second target vector corresponding to the first target vector to be added by subjecting the first target vector to be added to the predetermined processing, and
select the cluster to which the first target vector to be added belongs based on the newly generated second target vector.

4. The object search system according to claim 1, wherein when executed by the at least one processor, the plurality of instructions cause the at least one processor to operate to:
increase, when an element-added target vector obtained by adding a number of elements to the first target vector is to be added, the one of the number of rows and the number of columns in the conversion matrix by the same number of elements as the added number of elements; and
newly generate the second target vector corresponding to the element-added target vector based on the conversion matrix in which the one of the number of rows and the number of columns is increased number of dimensions, and select the cluster to which the added element-added target vector belongs based on the newly generated second target vector.

5. A method of searching an object, comprising:
a target vector acquisition step of acquiring, with at least one processor operating with a memory device in a search server, a plurality of first target vectors each of which has a first number of elements;
a second target vector generation step of generating, with the at least one processor operating with the memory device in the search server, a plurality of second target vectors each of which has a second number of elements by subjecting each of the plurality of first target vectors to predetermined processing wherein the second number is smaller than the first number;
a clustering step of acquiring with the at least one processor operating with the memory device in the search server, based on the plurality of second target vectors, a plurality of clusters each comprising at least one of the plurality of first target vectors and at least one of the plurality of the second target vectors, each of the at least one second target vectors corresponding to one of the at least one first target vectors; and
a searching step of searching, with the at least one processor, target vectors similar to a query vector which has a same number of elements as the plurality of first target vectors, comprising:
a second query vector generation step for generating, with the at least one processor operating with the memory device in the search server, a second query vector having a same number of elements as the plurality of second target vectors by subjecting the query vector to the predetermined processing;
a cluster selection step for selecting, with the at least one processor operating with the memory device in the search server, one or more clusters from the plurality of clusters based on the second query vector;
a similarity calculation step of calculating, with the at least one processor operating with the memory device in the search server, a similarity between each of the at least one first target vectors belonging to the selected one or more clusters and the query vector; and
an outputting step of outputting an object indicated by one of the at least one first target vector having a highest calculated similarity,
wherein the predetermined processing is to calculate each of the plurality of second target vectors by calculating a product between each of the plurality of first target vectors and a conversion matrix that includes a plurality of randomly determined vector elements, wherein one of a number of rows and a number of columns in the conversion matrix is the first number and other of the number of rows and the number of columns in the conversion matrix is the second number.

6. A non-transitory computer readable storage medium storing a plurality of instructions, wherein when executed by at least one processor, the plurality of instructions cause the at least one processor to:

acquire a plurality of first target vectors each of which has a first number of elements;

generate a plurality of second target vectors each of which has a second number of elements by subjecting each of the plurality of first target vectors to predetermined processing wherein the second number is smaller than the first number;

acquire, based on the plurality of second target vectors, a plurality of clusters each comprising at least one of the plurality of first target vectors and at least one of the plurality of the second target vectors, each of the at least one second target vectors corresponding to one of the at least one first target vectors; and search, by the at least one processor, target vectors similar to a query vector which has a same number of elements as the plurality of first target vectors, comprising:

generate a second query vector having a same number of elements as the plurality of second target vectors by subjecting the query vector to the predetermined processing;

select one or more clusters from the plurality of clusters based on the second query vector;

calculate a similarity between each of the at least one first target vectors belonging to the selected one or more clusters and the query vector; and output an object indicated by one of the at least one first target vector having a highest calculated similarity, wherein the plurality of instructions cause the at least one processor to calculate each of the plurality of second target vectors by calculating a product between each of the plurality of first target vectors and a conversion matrix that includes a plurality of randomly determined vector elements wherein one of a number of rows and a number of columns in the conversion matrix is the first number and other of the number of rows and the number of columns in the conversion matrix is the second number.

* * * * *